(12) United States Patent
Williams et al.

(10) Patent No.: US 11,319,056 B2
(45) Date of Patent: May 3, 2022

(54) WING-NACELLE SPLICE ASSEMBLIES FOR TILTROTOR AIRCRAFT

(71) Applicant: Textron Innovations Inc., Providence, RI (US)

(72) Inventors: Jeffrey Matthew Williams, Hudson Oaks, TX (US); George Ryan Decker, Fort Worth, TX (US); Michael Edwin Rinehart, Euless, TX (US); Andrew G. Baines, Southlake, TX (US); James Elbert King, N. Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 253 days.

(21) Appl. No.: 16/788,888

(22) Filed: Feb. 12, 2020

(65) Prior Publication Data

US 2020/0198762 A1   Jun. 25, 2020

Related U.S. Application Data

(63) Continuation of application No. 15/787,148, filed on Oct. 18, 2017, now Pat. No. 10,604,232.

(51) Int. Cl.
| | |
|---|---|
| *B64C 7/02* | (2006.01) |
| *B64C 3/26* | (2006.01) |
| *B64C 29/00* | (2006.01) |
| *B64C 27/28* | (2006.01) |

(52) U.S. Cl.
CPC .................. *B64C 7/02* (2013.01); *B64C 3/26* (2013.01); *B64C 27/28* (2013.01); *B64C 29/0033* (2013.01); *B64C 29/0075* (2013.01)

(58) Field of Classification Search
CPC .. B64C 3/26; B64C 7/02; B64C 27/28; B64C 29/0033; B64C 29/0075
USPC ........................................................... 244/56
See application file for complete search history.

(56) References Cited

U.S. PATENT DOCUMENTS

| | | | |
|---|---|---|---|
| 2,393,081 | A | 1/1946 | Michael |
| 2007/0051851 | A1 | 3/2007 | Ruffin et al. |
| 2011/0147521 | A1 | 6/2011 | Delahaye et al. |
| 2011/0215202 | A1 | 9/2011 | Rhoden et al. |
| 2015/0048214 | A1 | 2/2015 | Bockmiller et al. |

OTHER PUBLICATIONS www.youtube.com; James Drew; Bell V280 Valor Mating of Wing and Nacelles; Internet Link: https://www.youtube.com/watch?v=0LOljv2evMs; Apr. 24, 2016.

*Primary Examiner* — Brady W Frazier
(74) *Attorney, Agent, or Firm* — Lawrence Youst PLLC

(57) ABSTRACT

A propulsion and lift system of a tiltrotor aircraft includes a wing having an outboard end, a wing tip assembly having an inboard end, a fixed nacelle coupled to the wing tip assembly and a wing-nacelle splice assembly having inboard and outboard sides. The inboard side of the wing-nacelle splice assembly is coupled to the outboard end of the wing, and the outboard side of the wing-nacelle splice assembly is coupled to the inboard end of the wing tip assembly, thereby coupling the fixed nacelle to the wing.

17 Claims, 8 Drawing Sheets

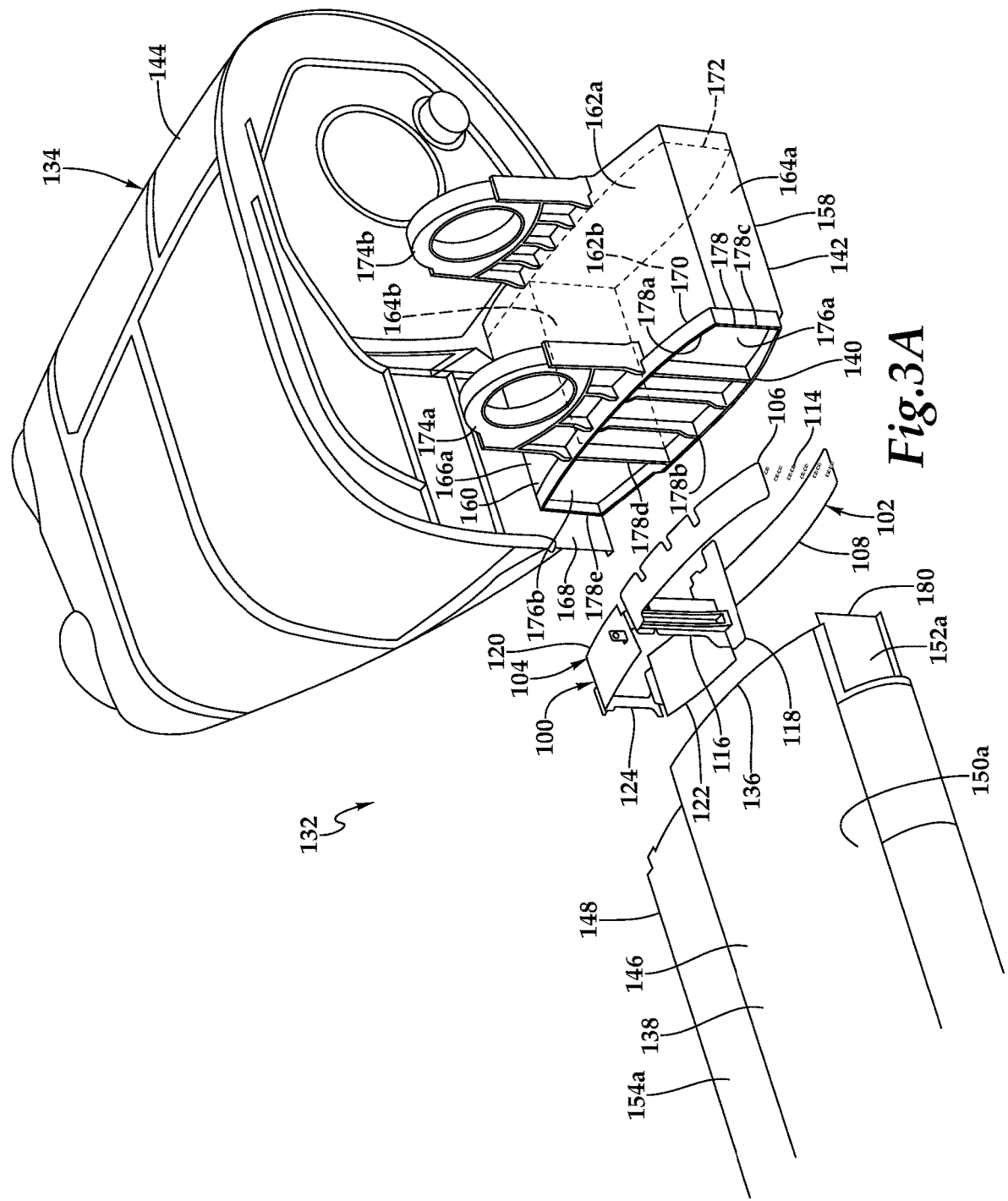

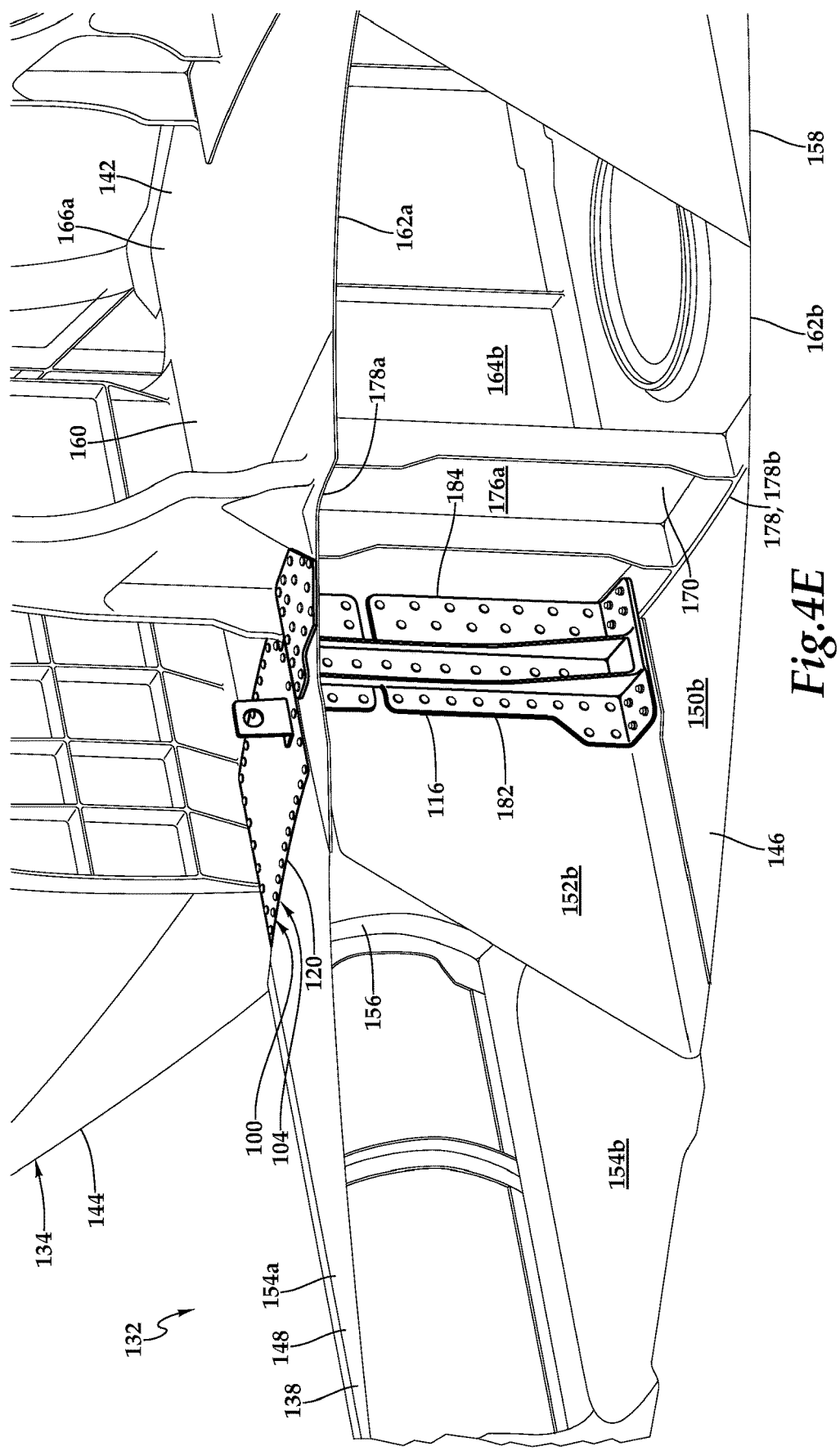

WING-NACELLE SPLICE ASSEMBLIES FOR TILTROTOR AIRCRAFT

CROSS-REFERENCE TO RELATED APPLICATIONS

The present application is a continuation of co-pending application Ser. No. 15/787,148 filed Oct. 18, 2017.

TECHNICAL FIELD OF THE DISCLOSURE

The present disclosure relates, in general, to tiltrotor aircraft having a wing with fixed nacelles mounted thereto and, in particular, to wing-nacelle splice assemblies for coupling fixed nacelles to the outboard ends of a wing of a tiltrotor aircraft.

BACKGROUND

Tiltrotor aircraft typically include multiple propulsion assemblies that are positioned near the outboard ends of a wing. Each propulsion assembly may include an engine and transmission that provide torque and rotational energy to a drive shaft that rotates a proprotor assembly including a hub assembly and a plurality of proprotor blades. Typically, a pylon assembly, which includes the proprotor assembly, is rotatable relative to the wing such that the proprotor blades have a generally horizontal plane of rotation providing vertical lift for takeoff, hovering and landing, much like a conventional helicopter, and a generally vertical plane of rotation providing forward thrust for cruising in forward flight with the wing providing lift, much like a conventional propeller driven airplane. In addition, tiltrotor aircraft can be operated in configurations between the helicopter flight mode and the airplane flight mode, which may be referred to as conversion flight mode.

In conventional tiltrotor aircraft, each nacelle that houses an engine and a transmission is also rotatable relative to the wing. Such nacelles rotate about a spindle that is inserted or stabbed into an outboard end of the wing. It has been found, however, that certain structural and aerodynamic advantages may be obtained by fixedly (i.e., non-rotatably) coupling the nacelles to the wing. To optimize the manufacture of such fixed nacelle tiltrotor aircraft, it may be useful to assemble the fixed nacelles in parallel with the wing to decrease the overall assembly time and cost of the tiltrotor aircraft. After separate assembly, the joint between the fixed nacelles and wing must withstand the high forces experienced during flight. Accordingly, a need has arisen for a stable and reliable interface between the wing and fixed nacelles of a tiltrotor aircraft.

SUMMARY

In a first aspect, the present disclosure is directed to a propulsion and lift system of a tiltrotor aircraft including a wing having an outboard end, a wing tip assembly having an inboard end, a fixed nacelle coupled to the wing tip assembly and a wing-nacelle splice assembly having inboard and outboard sides. The inboard side of the wing-nacelle splice assembly is coupled to the outboard end of the wing, and the outboard side of the wing-nacelle splice assembly is coupled to the inboard end of the wing tip assembly, thereby coupling the fixed nacelle to the wing.

In some embodiments, the inboard end of the wing tip assembly may include an inboard tip rib having an inboard flange, and the wing-nacelle splice assembly may couple the outboard end of the wing to the inboard flange of the inboard tip rib. In certain embodiments, the wing tip assembly may include an outboard tip rib. In some embodiments, the wing may include a torque box having an outboard end, the wing tip assembly may include a wing tip box having an inboard end and the wing-nacelle splice assembly may couple the outboard end of the torque box to the inboard end of the wing tip box.

In certain embodiments, the torque box and the wing tip box may each include a lower skin, and the wing-nacelle splice assembly may include a lower torque box shear strap coupling the lower skins of the torque box and the wing tip box. In some embodiments, the torque box and the wing tip box may each include an upper skin, and the wing-nacelle splice assembly may include an upper torque box shear strap coupling the upper skins of the torque box and the wing tip box. In certain embodiments, the wing tip assembly may include an inboard tip rib including an upper inboard flange interposed between the upper skins and a lower inboard flange interposed between the lower skins. In such embodiments, the lower torque box shear strap may couple the lower skin of the torque box to the lower inboard flange of the tip rib, thereby coupling the lower skins of the torque box and the wing tip box, and the upper torque box shear strap may couple the upper skin of the torque box to the upper inboard flange of the tip rib, thereby coupling the upper skins of the torque box and the wing tip box. In some embodiments, the upper torque box shear strap may include an outer strap and an inner strap. In such embodiments, the outer strap may couple the outer surface of the upper inboard flange of the tip rib to the outer surface of the upper skin of the torque box, and the inner strap may couple the inner surface of the upper inboard flange of the tip rib to the inner surface of the upper skin of the torque box such that the upper inboard flange and an outboard edge of the upper skin of the torque box are sandwiched by the outer and inner straps.

In certain embodiments, the torque box and the wing tip box may each include a forward spar, and the wing-nacelle splice assembly may include fasteners coupling the forward spars of the torque box and the wing tip box. In some embodiments, the torque box and the wing tip box may each include an aft spar, and the wing-nacelle splice assembly may include an aft spar splice coupling the aft spars of the torque box and the wing tip box. In certain embodiments, the torque box and the wing tip box may each include a lower skin having an outer surface, and the wing-nacelle splice assembly may include an aft spar splice support partially covering the outer surfaces of the lower skins, the aft spar splice support disposed beneath and coupled to the aft spar splice to provide support thereto. In some embodiments, the wing tip assembly may include an inboard tip rib including a forward inboard flange interposed between the forward spars and an aft inboard flange interposed between the aft spars. In such embodiments, the fasteners may couple the forward spar of the torque box to the forward inboard flange, thereby coupling the forward spars of the torque box and the wing tip box, and the aft spar splice may couple the aft spar of the torque box to the aft inboard flange, thereby coupling the aft spars of the torque box and the wing tip box. In certain embodiments, the forward spar of the torque box may include a tab out to overlap the forward inboard flange. The fasteners may couple the tab out to the forward inboard flange.

In some embodiments, the inboard end of the wing tip assembly may include an inboard tip rib. In such embodiments, the inboard tip rib may have a tip rib box section, and the inboard end of the wing tip box may include the tip rib box section. In certain embodiments, the wing may include a wing cove section having an outboard end, the wing tip assembly may include a wing tip cove section having an inboard end and the wing-nacelle splice assembly may couple the outboard end of the wing cove section to the inboard end of the wing tip cove section. In some embodiments, the wing cove section and the wing tip cove section may each include a lower skin, and the wing-nacelle splice assembly may include a lower cove shear strap coupling the lower skins of the wing cove section and the wing tip cove section. In certain embodiments, the wing cove section and the wing tip cove section may each include an upper skin, and the wing-nacelle splice assembly may include an upper cove shear strap coupling the upper skins of the wing cove section and the wing tip cove section. In some embodiments, the wing tip assembly may include an inboard tip rib including lower and upper inboard flanges, and the wing cove section may include an outboard cove rib including lower and upper outboard flanges. In such embodiments, the lower cove shear strap may couple the lower outboard flange of the outboard cove rib to the lower inboard flange of the inboard tip rib, thereby coupling the lower skins of the wing cove section and the wing tip cove section, and the upper cove shear strap may couple the upper outboard flange of the outboard cove rib to the upper inboard flange of the inboard tip rib, thereby coupling the upper skins of the wing cove section and the wing tip cove section. In certain embodiments, the outboard cove rib may include an aft outboard flange, the wing tip cove section may include an aft cove spar and the wing-nacelle splice assembly may include an aft cove splice coupling the aft outboard flange of the outboard cove rib to the aft cove spar of the wing tip cove section.

In a second aspect, the present disclosure is directed to a tiltrotor aircraft including a fuselage, a wing supported by the fuselage and having first and second outboard ends, first and second wing tip assemblies each having an inboard end, first and second fixed nacelles each coupled to a respective one of the first and second wing tip assemblies and first and second wing-nacelle splice assemblies. The first wing-nacelle splice assembly couples the first outboard end of the wing to the inboard end of the first wing tip assembly, and the second wing-nacelle splice assembly couples the second outboard end of the wing to the inboard end of the second wing tip assembly, thereby coupling the fixed nacelles to the wing.

In some embodiments, the wing may include a torque box and a wing cove section, the first and second wing tip assemblies may each include a wing tip box and a wing tip cove section and the first and second wing-nacelle splice assemblies may each include a box joint subassembly and a cove joint subassembly. In such embodiments, each box joint subassembly may couple a respective one of the wing tip boxes to a respective outboard end of the torque box, and each cove joint subassembly may couple a respective one of the wing tip cove sections to a respective outboard end of the wing cove section. In certain embodiments, each wing tip assembly may include inboard and outboard tip ribs having pillow block mounts protruding vertically therefrom. In some embodiments, the tiltrotor aircraft may include first and second pylon assemblies each rotatably coupled to the pillow block mounts of a respective one of the first and second wing tip assemblies.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3C are exploded isometric views of a propulsion and lift system utilizing a wing-nacelle splice assembly in accordance with embodiments of the present disclosure;

FIGS. 4A-4E are various views of a propulsion and lift system utilizing a wing-nacelle splice assembly in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
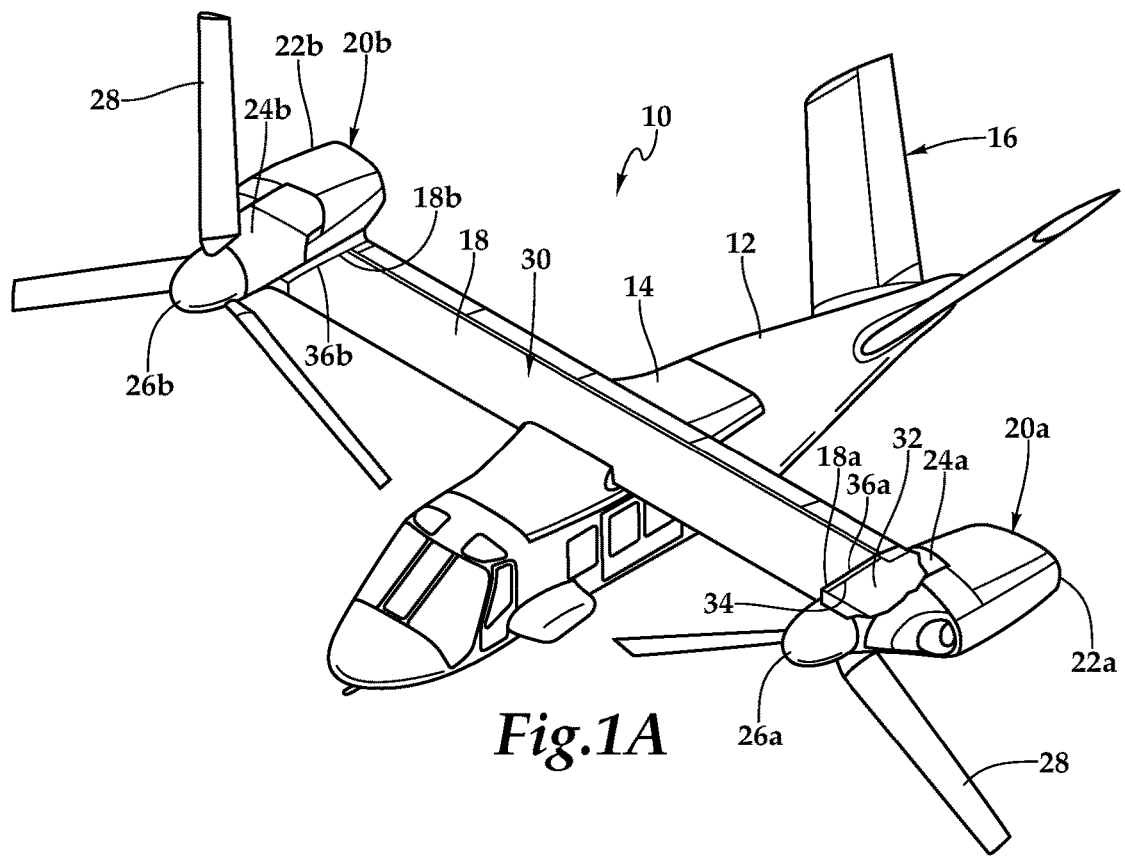
FIGS. 1A-1B are schematic illustrations of a tiltrotor aircraft utilizing wing-nacelle splice assemblies in accordance with embodiments of the present disclosure.
Figure 1B:
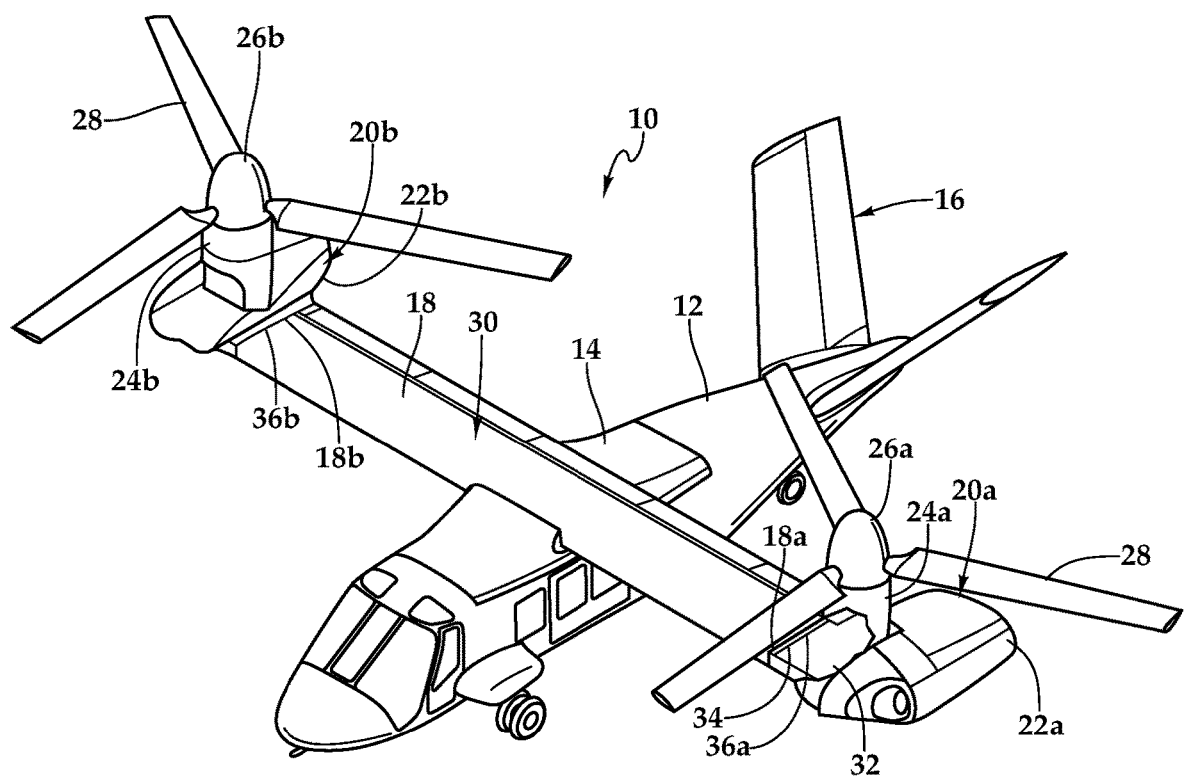

Referring to FIGS. 1A-1B in the drawings, a tiltrotor aircraft is schematically illustrated and generally designated 10. Tiltrotor aircraft 10 includes a fuselage 12, a wing mount assembly 14 that may be rotatable relative to fuselage 12 and a tail assembly 16 having control surfaces operable for horizontal and/or vertical stabilization during forward flight. A wing 18 is supported by fuselage 12 and wing mount assembly 14, and may rotate with wing mount assembly 14 relative to fuselage 12 to enable tiltrotor aircraft 10 to convert to a storage configuration. Together, fuselage 12, tail assembly 16 and wing 18 as well as their various frames, supports, longerons, stringers, bulkheads, spars, ribs and skins may be considered to be the airframe of tiltrotor aircraft 10.

Coupled to outboard ends 18a, 18b of wing 18 are propulsion assemblies 20a, 20b. Propulsion assemblies 20a, 20b include fixed nacelles 22a, 22b, respectively, each of which preferably houses an engine and a fixed portion of a drive system. Fixed nacelles 22a, 22b are non-rotatable relative to wing 18. A pylon assembly 24a is rotatable relative to fixed nacelle 22a and wing 18 between a generally horizontal orientation, as best seen in FIG. 1A, and a generally vertical orientation, as best seen in FIG. 1B. Pylon assembly 24a includes a rotatable portion of the drive system and a proprotor assembly 26a that is rotatable responsive to torque and rotational energy provided via the engine and drive system. Likewise, a pylon assembly 24b is rotatable relative to fixed nacelle 22b and wing 18 between a generally horizontal orientation, as best seen in FIG. 1A, and a generally vertical orientation, as best seen in FIG. 1B. Pylon assembly 24b includes a rotatable portion of the drive system and a proprotor assembly 26b that is rotatable responsive to torque and rotational energy provided via the engine and drive system. In the illustrated embodiment, proprotor assemblies 26a, 26b each include three proprotor blade assemblies 28. It should be understood by those having ordinary skill in the art, however, that proprotor assemblies 26a, 26b could alternatively have a different number of proprotor blades, either less than or greater than three. In addition, it should be understood that the position of pylon assemblies 24a, 24b, the angular velocity or revolutions per minute (RPM) of proprotor assemblies 26a, 26b, the pitch of proprotor blades 28 and the like may be controlled by the pilot of tiltrotor aircraft 10 and/or a flight control system to selectively control the direction, thrust and lift of tiltrotor aircraft 10 during flight.

FIG. 1A illustrates tiltrotor aircraft 10 in a forward flight mode or airplane flight mode, in which proprotor assemblies 26a, 26b are positioned to rotate in a substantially vertical plane and provide a forward thrust while a lifting force is supplied by wing 18 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor assemblies 26a, 26b are positioned to rotate in a substantially horizontal plane and provide a vertical thrust such that tiltrotor aircraft 10 flies much like a conventional helicopter. During operation, tiltrotor aircraft 10 may convert from helicopter flight mode to airplane flight mode following vertical takeoff and/or hover. Likewise, tiltrotor aircraft 10 may convert back to helicopter flight mode from airplane flight mode for hover and/or vertical landing. In addition, tiltrotor aircraft 10 can perform certain flight maneuvers with proprotor assemblies 26a, 26b positioned between airplane flight mode and helicopter flight mode, which can be referred to as conversion flight mode.

Preferably, each fixed nacelle 22a, 22b houses a drive system, such as an engine and transmission, for supplying torque and rotational energy to a respective proprotor assembly 26a, 26b. In such embodiments, the drive systems of each fixed nacelle 22a, 22b may be coupled together via one or more drive shafts located in wing 18 such that either drive system can serve as a backup to the other drive system in the event of a failure. Alternatively or additionally, fuselage 12 may include a drive system, such as an engine and transmission, for providing torque and rotational energy to each proprotor assembly 26a, 26b via one or more drive shafts located in wing 18. In tiltrotor aircraft having both nacelle and fuselage mounted drive systems, the fuselage mounted drive system may serve as a backup drive system in the event of failure of either or both of the nacelle mounted drive systems.

Wing 18 and propulsion assemblies 20a, 20b form a propulsion and lift system 30 for tiltrotor aircraft 10. Fixed nacelle 22a is fixedly coupled and assembled onto a wing tip assembly 32. Wing tip assembly 32 has an inboard end 34. Wing 18 may be assembled separate from and/or parallel to wing tip assembly 32 and fixed nacelle 22a to reduce the time and cost required to assemble propulsion and lift system 30. Tiltrotor aircraft 10 may include a wing-nacelle splice assembly 36a to fixedly couple inboard end 34 of wing tip assembly 32 to outboard end 18a of wing 18, thereby coupling fixed nacelle 22a to wing 18. Wing-nacelle splice assembly 36b couples fixed nacelle 22b to wing 18 in a similar fashion. Wing-nacelle splice assemblies 36a, 36b may act as shear lap joints that provide a stable and fixed interface between wing 18 and fixed nacelles 22a, 22b.

It should be appreciated that tiltrotor rotorcraft 10 is merely illustrative of a variety of aircraft that can implement the embodiments disclosed herein. Indeed, wing-nacelle splice assemblies 36a, 36b may be utilized on any winged aircraft or any aircraft having an engine mounted thereto. Other aircraft implementations can include helicopters, hybrid aircraft, tiltwing aircraft, quad tiltrotor aircraft, unmanned aircraft, gyrocopters, propeller airplanes and the like. As such, those skilled in the art will recognize that any number of wing-nacelle splice assemblies 36a, 36b disclosed herein can be integrated into a variety of aircraft configurations. It should be appreciated that even though aircraft are particularly well-suited to implement the embodiments of the present disclosure, non-aircraft vehicles and devices can also implement the embodiments.

Figure 2:
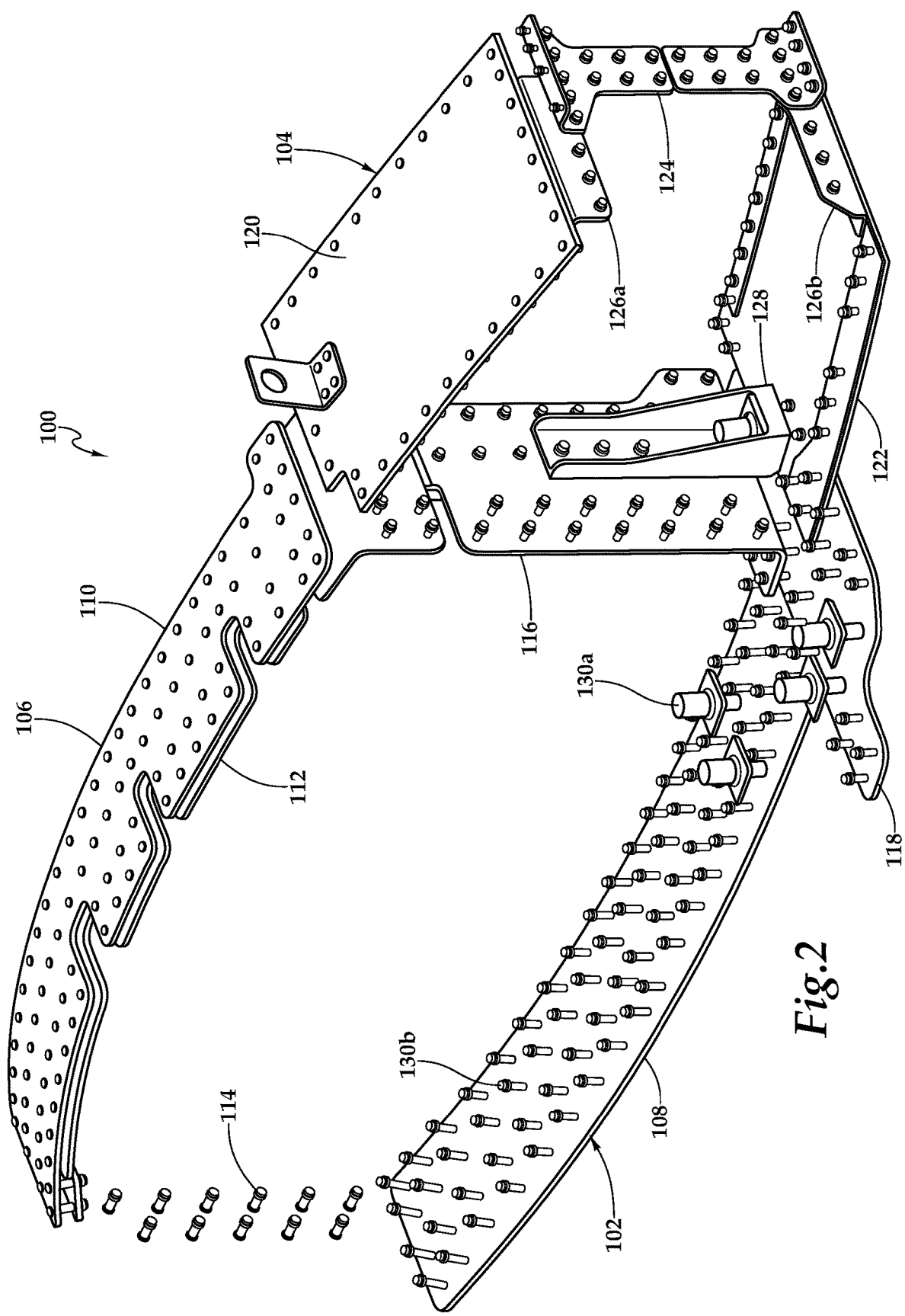
FIG. 2 is an isometric view of a wing-nacelle splice assembly in accordance with embodiments of the present disclosure.

Referring to FIG. 2 in the drawings, a wing-nacelle splice assembly is schematically illustrated and generally designated 100. Wing-nacelle splice assembly 100 includes a box joint subassembly 102 and a cove joint subassembly 104. Cove joint subassembly 104 is aft of box joint subassembly 102. Box joint subassembly 102 includes upper and lower torque box shear straps 106, 108. Upper torque box shear strap 106 includes an outer strap 110 and an inner strap 112. In other embodiments, either or both of upper or lower torque box shear straps 106 or 108 may include outer and inner straps. The forward side of box joint subassembly 102 includes fasteners 114, such as rivets or Hi-Loks. The aft side of box joint subassembly 102 includes an aft spar splice 116. Aft spar splice support 118 is disposed beneath and coupled to aft spar splice 116 to provide support thereto. Cove joint subassembly 104 includes upper and lower cove shear straps 120, 122. The aft side of cove joint subassembly 104 includes an aft cove splice 124. Wing-nacelle splice assembly 100 may also include various connectors, brackets, supports and fasteners, such as brackets 126a, 126b, support 128 and fasteners 130a, 130b, to facilitate the structural integrity and operation of wing-nacelle splice assembly 100. In other embodiments, adhesive may be used in addition to or in lieu of mechanical connectors, brackets and/or fasteners.

Figure 3B:
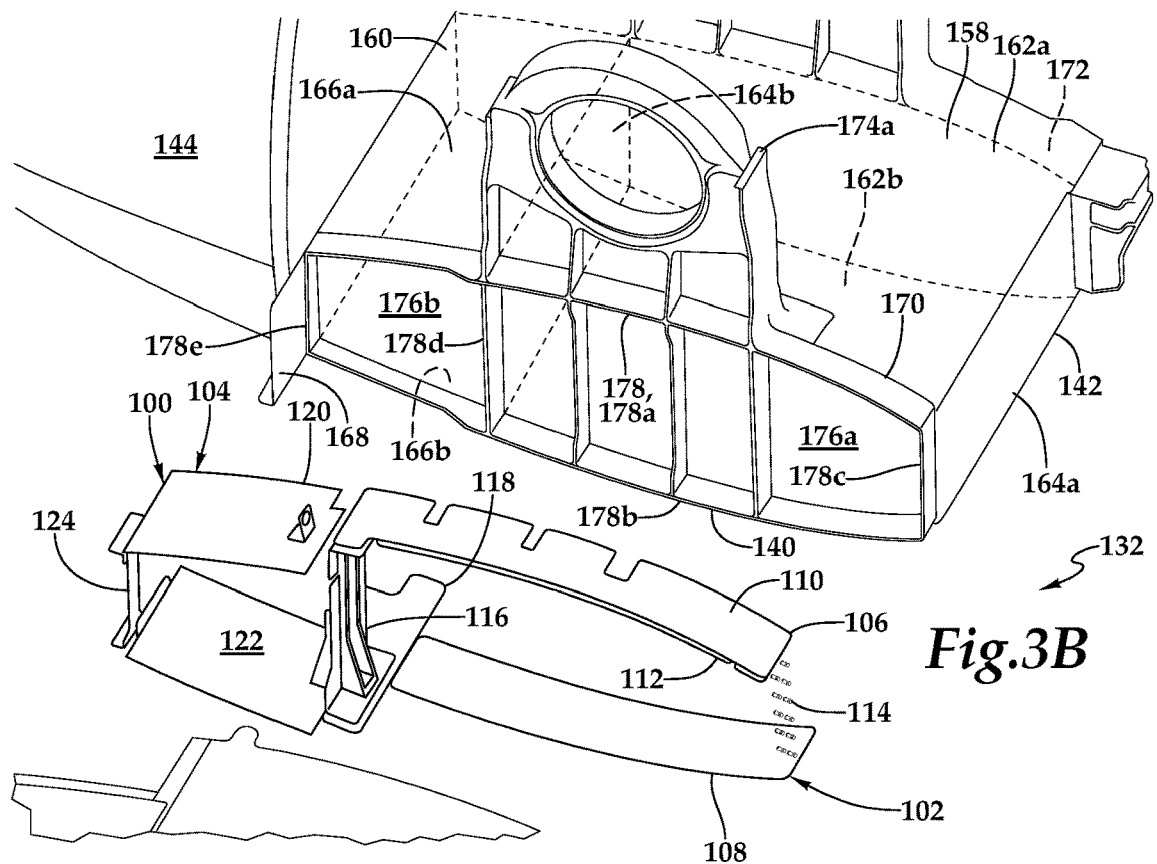
Figure 3C:
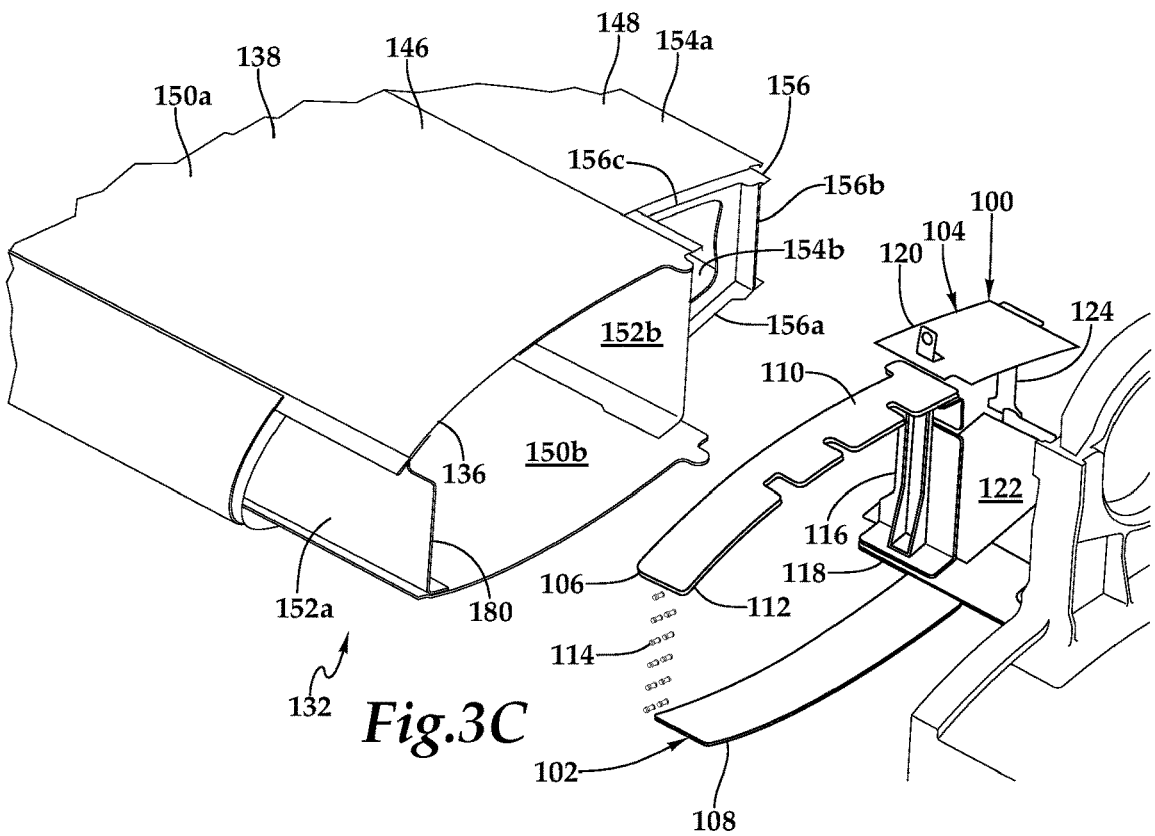
Figure 4A:
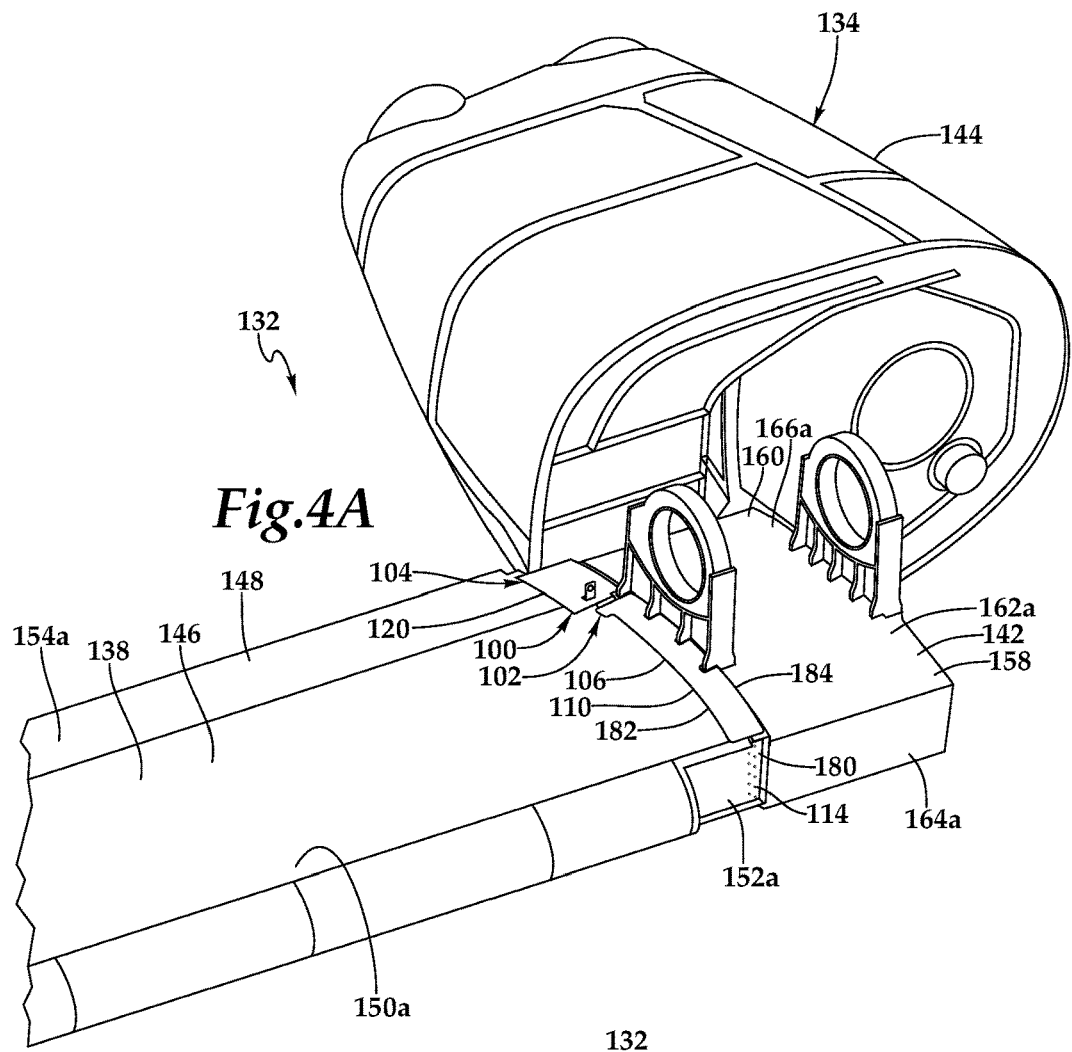
Figure 4B:
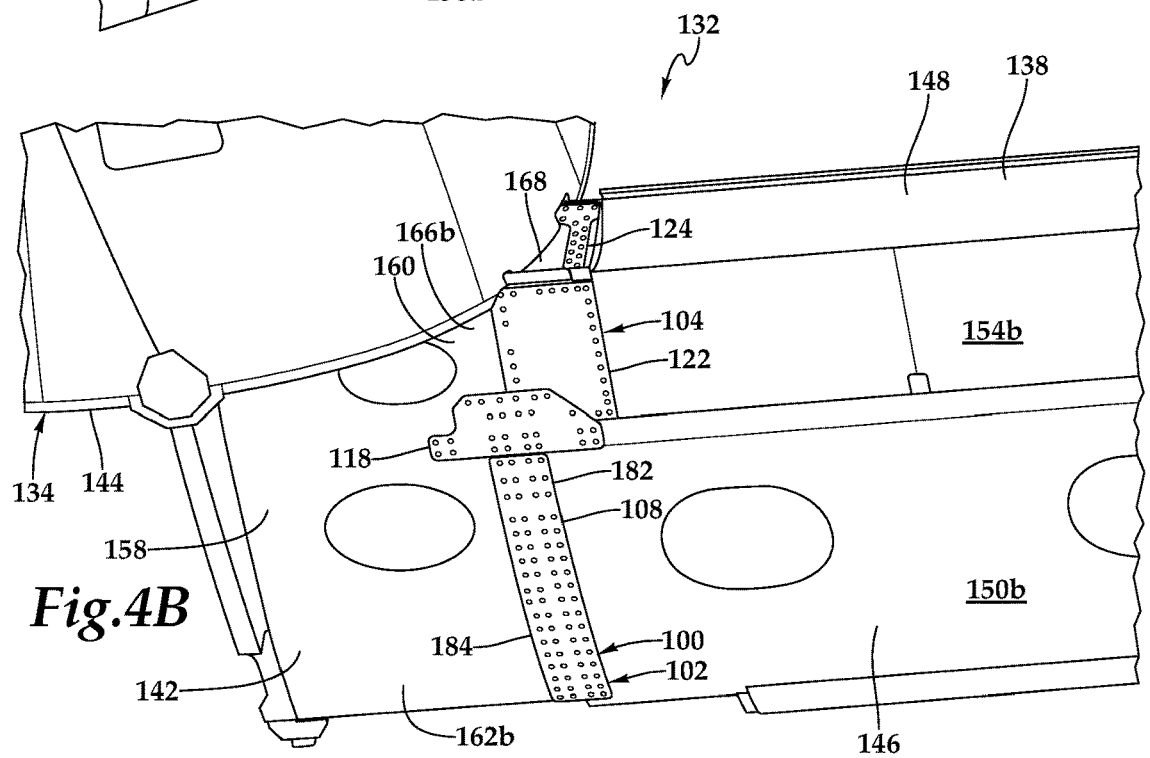
Figure 4C:
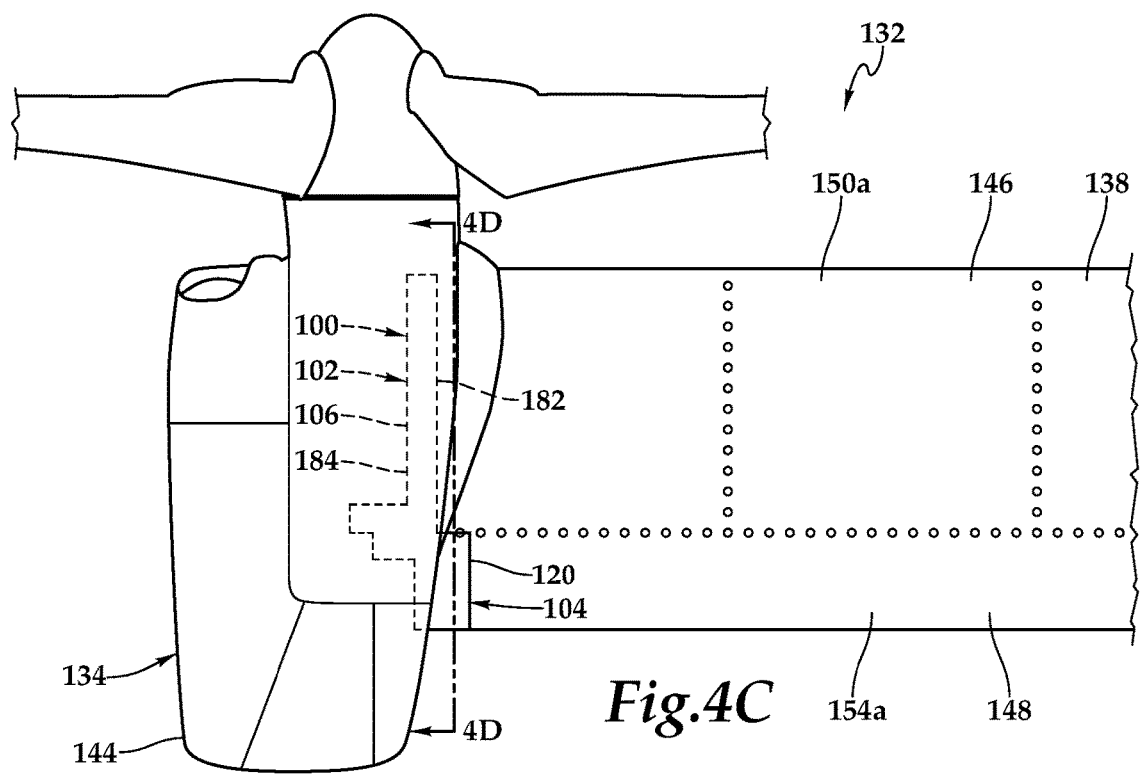
Figure 4D:
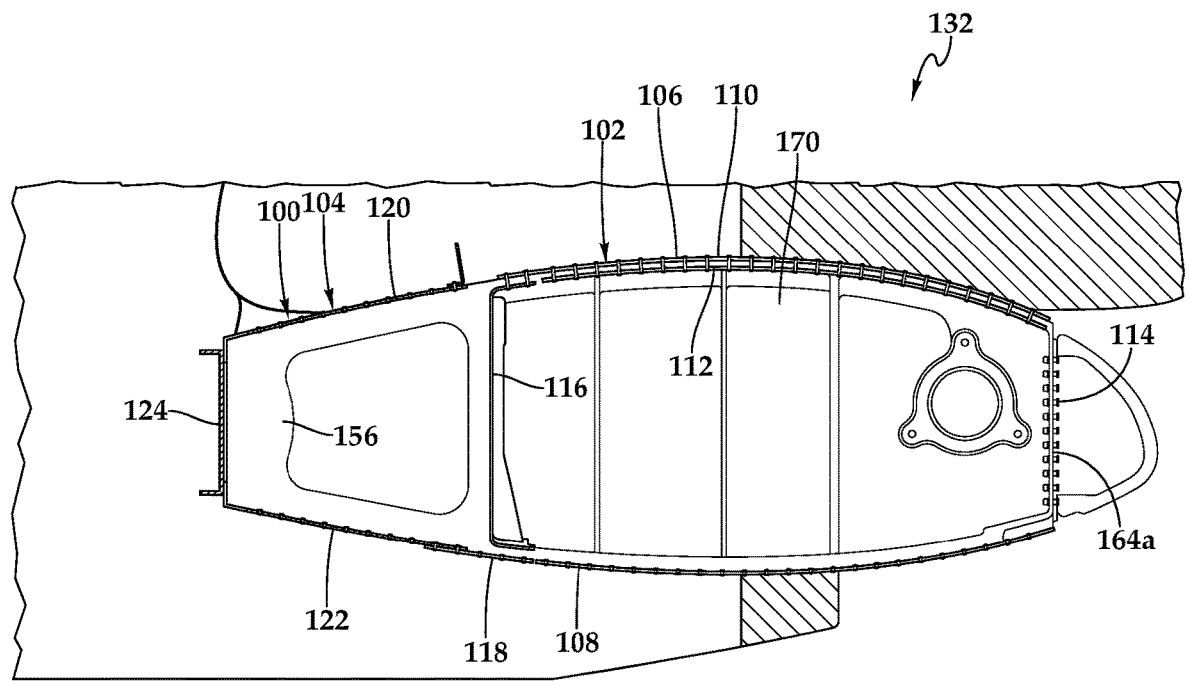

Referring to FIGS. 3A-3C in the drawings, a propulsion and lift system of a tiltrotor aircraft is schematically illustrated and generally designated 132. In FIGS. 3A-3C, portions of propulsion assembly 134, such as the rotatable pylon assembly, have been removed to better illustrate the structure and operation of the illustrative embodiments. Wing-nacelle splice assembly 100 couples outboard end 136 of wing 138 to inboard end 140 of wing tip assembly 142, thereby coupling fixed nacelle 144 to wing 138. Wing 138 includes a torque box 146 and a wing cove section 148. Torque box 146 is configured to distribute loads, shears and other motions and forces in various flight modes. Torque box 146 includes upper and lower skins 150a, 150b and forward and aft spars 152a, 152b. Wing cove section 148 includes upper and lower skins 154a, 154b. The outboard end of wing cove section 148 includes an outboard cove rib 156 having lower, aft and upper outboard flanges 156a, 156b, 156c.

Fixed nacelle 144 is fixedly coupled to or built around wing tip assembly 142, which is then mated or coupled to wing 138 using wing-nacelle splice assembly 100. All or a portion of fixed nacelle 144, such as the portion illustrated in FIGS. 3A-3C, may be coupled to wing tip assembly 142 prior to splicing wing tip assembly 142 to wing 138. Wing tip assembly 142 includes a wing tip box 158 and a wing tip cove section 160. Wing tip box 158 includes upper and lower skins 162a, 162b and forward and aft spars 164a, 164b. Wing tip cove section 160 includes upper and lower skins 166a, 166b and aft cove spar 168.

The inboard end of wing tip assembly 142 includes an inboard tip rib 170. Wing tip assembly 142 also includes an outboard tip rib 172. Pillow block mounts 174a, 174b protrude upwardly and vertically from inboard and outboard tip ribs 170 and 172, respectively. A pylon assembly, such as pylon assembly 24a in FIGS. 1A-1B, may be rotatably mounted to pillow block mounts 174a, 174b. Inboard tip rib 170 includes a tip rib box section 176a and a tip rib cove section 176b. The inboard end of wing tip box 158 includes tip rib box section 176a and the inboard end of wing tip cove section 160 includes tip rib cove section 176b. Inboard tip rib 170 includes an inboard flange 178 having various sections. In particular, inboard flange 178 has an upper inboard flange 178a, a lower inboard flange 178b, a forward inboard flange 178c and an aft inboard flange 178d. Inboard flange 178 may also include an aft cove inboard flange 178e. Upper inboard flange 178a is interposed between upper skins 162a, 166a of wing tip assembly 142 and upper skins 150a, 154a of wing 138. Lower inboard flange 178b is interposed between lower skins 162b, 166b of wing tip assembly 142 and lower skins 150b, 154b of wing 138. Forward inboard flange 178c is interposed between forward spar 164a of wing tip box 158 and forward spar 152a of torque box 146. The outboard end of forward spar 152a includes a tab out 180 adapted to overlap forward inboard flange 178c. Aft inboard flange 178d is interposed between aft spar 164b of wing tip box 158 and aft spar 152b of torque box 146. Wing 138, wing tip assembly 142, inboard tip rib 170 and wing-nacelle splice assembly 100 may be formed from any material suitable for flight. In one non-limiting example, wing 138 and wing tip assembly 142 may be at least partially formed from a composite material and inboard tip rib 170 and wing-nacelle splice assembly 100 may be at least partially formed from aluminum.

Referring to FIGS. 4A-4E in conjunction with FIGS. 3A-3C in the drawings, inboard side 182 of wing-nacelle splice assembly 100 is coupled to outboard end 136 of wing 138 and outboard side 184 of wing-nacelle splice assembly 100 is coupled to inboard end 140 of wing tip assembly 142, thereby coupling fixed nacelle 144 to wing 138. Box joint subassembly 102 of wing-nacelle splice assembly 100 couples the outboard end of torque box 146 to the inboard end of wing tip box 158 and cove joint subassembly 104 couples the outboard end of wing cove section 148 to the inboard end of wing tip cove section 160. Wing-nacelle splice assembly 100 couples wing 138 to wing tip assembly 142 by coupling outboard end 136 of wing 138 to certain portions of inboard flange 178 of inboard tip rib 170. Upper torque box shear strap 106 couples upper skin 150a of torque box 146 to upper inboard flange 178a of inboard tip rib 170, thereby coupling upper skin 150a of torque box 146 to upper skin 162a of wing tip box 158. More specifically, outer strap 110 of upper torque box shear strap 106 couples the outer surface of upper inboard flange 178a to the outer surface of upper skin 150a of torque box 146 and inner strap 112 of upper torque box shear strap 106 couples the inner surface of upper inboard flange 178a to the inner surface of upper skin 150a of torque box 146 such that upper inboard flange 178a and the outboard edge of upper skin 150a of torque box 146 are sandwiched between outer and inner straps 110 and 112.

Lower torque box shear strap 108 couples lower skin 150b of torque box 146 to lower inboard flange 178b, thereby coupling lower skin 150b of torque box 146 to lower skin 162b of wing tip box 158. Fasteners 114 couple tab out 180 to forward inboard flange 178c, thereby coupling forward spar 152a of torque box 146 to forward spar 164a of wing tip box 158. In other embodiments, forward spar 152a may exclude tab out 180, and wing-nacelle splice assembly 100 may include a forward strap that couples forward spars 152a and 164a. As best seen in FIG. 4E, which is an isometric cross-sectional view of propulsion and lift system 132, aft spar splice 116 couples aft spar 152b of torque box 146 to aft inboard flange 178d, thereby coupling aft spar 152b of torque box 146 to aft spar 164b of wing tip box 158. Aft spar splice support 118, best seen in FIG. 4B, partially covers the outer surfaces of either or both of lower skins 150b and 162b. Aft spar splice support 118 is disposed beneath aft spar splice 116. Aft spar splice support 118 is also coupled to aft spar splice 116 to provide support thereto.

Upper cove shear strap 120 couples upper outboard flange 156c of outboard cove rib 156 to upper inboard flange 178a of inboard tip rip 170, thereby coupling upper skin 154a of wing cove section 148 to upper skin 166a of wing tip cove section 160. Lower cove shear strap 122 couples lower outboard flange 156a of outboard cove rib 156 to lower inboard flange 178b of inboard tip rib 170, thereby coupling lower skin 154b of wing cove section 148 to lower skin 166b of wing tip cove section 160. Aft cove splice 124 couples aft outboard flange 156b of outboard cove rib 156 to aft cove spar 168 of wing tip cove section 160. In other embodiments, aft cove splice 124 may couple aft outboard flange 156b of outboard cove rib 156 to aft cove inboard flange 178e of inboard tip rip 170. Any type of mechanical fastener, such as rivets or Hi-Loks, may be used to couple wing-nacelle splice assembly 100 to wing 138, wing tip assembly 142 or other components. In other embodiments, adhesive may be used in addition to or in lieu of mechanical fasteners.

FIGS. 3A-3C and 4A-4E describe a wing-nacelle splice assembly on one outboard end of wing 138. However, the other outboard end of wing 138 may also include a wing-nacelle splice assembly, such as wing-nacelle splice assembly 36b at outboard end 18b of wing 18 in FIGS. 1A-1B. Such a wing-nacelle splice assembly may be substantially similar to wing-nacelle splice assembly 100 therefore, for sake of efficiency, certain features have been disclosed only with regard to wing-nacelle splice assembly 100. One having ordinary skill in the art, however, will fully appreciate an understanding of wing-nacelle splice assemblies elsewhere on the tiltrotor aircraft based upon the disclosure herein of wing-nacelle splice assembly 100. In some embodiments, wing-nacelle splice assembly 100 may be used to couple a fixed nacelle to a wing lacking a torque box or other box-like shape, in which case wing 138 and/or wing tip assembly 142 may have an irregular or rounded shape.

Figure 5:
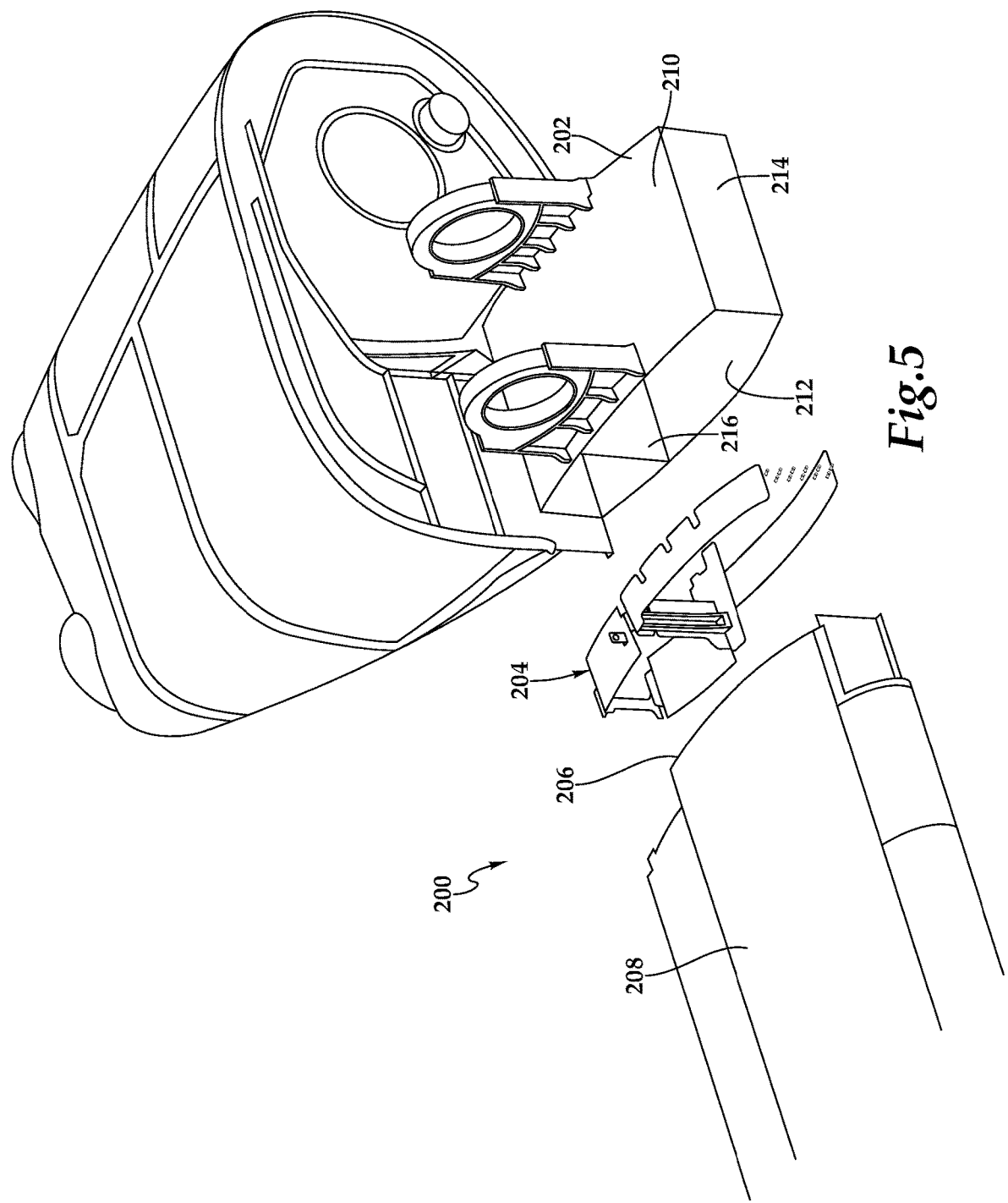
FIG. 5 is an exploded isometric view of a propulsion and lift system utilizing a wing-nacelle splice assembly in accordance with embodiments of the present disclosure.

Referring to FIG. 5 in the drawings, a propulsion and lift system of a tiltrotor aircraft is schematically illustrated and generally designated 200. In contrast to the previous embodiments, wing tip assembly 202 lacks an inboard tip rib. Wing-nacelle splice assembly 204 may couple outboard end 206 of wing 208 directly to upper skin 210, lower skin 212 and spars 214, 216 of wing tip assembly 202 instead of via an immediate component such as an inboard tip rib. In other embodiments, wing-nacelle splice assembly 204 may itself include a rib, similar in structure to an inboard tip rib, to provide additional structural support to the joint between wing 208 and wing tip assembly 202.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A propulsion and lift system of a tiltrotor aircraft comprising:
   a wing including a torque box having an outboard end and a wing cove section having an outboard end and a lower skin;
   a wing tip assembly including a wing tip box having an inboard end and a wing tip cove section having an inboard end and a lower skin;
   a fixed nacelle coupled to the wing tip assembly; and
   a wing-nacelle splice assembly having inboard and outboard sides and a lower cover shear strap, the inboard side of the wing-nacelle splice assembly coupled to the outboard end of the torque box and the outboard end of the wing cove section, the outboard side of the wing-nacelle splice assembly coupled to the inboard end of the wing tip box and the inboard end of the wing tip cove section and the lower cove shear strap coupled to the lower skins of the wing cove section and the wing tip cove section, thereby coupling the fixed nacelle to the wing.

2. The propulsion and lift system as recited in claim 1 wherein the inboard end of the wing tip assembly further comprises an inboard tip rib having an inboard flange, the wing-nacelle splice assembly coupling the outboard end of the wing to the inboard flange of the inboard tip rib.

3. The propulsion and lift system as recited in claim 1 wherein the torque box and the wing tip box each further comprise a lower skin, the wing-nacelle splice assembly further comprising a lower torque box shear strap coupling the lower skins of the torque box and the wing tip box.

4. The propulsion and lift system as recited in claim 3 wherein the torque box and the wing tip box each further comprise an upper skin, the wing-nacelle splice assembly further comprising an upper torque box shear strap coupling the upper skins of the torque box and the wing tip box.

5. The propulsion and lift system as recited in claim 4 wherein the wing tip assembly further comprises an inboard tip rib including an upper inboard flange interposed between the upper skins and a lower inboard flange interposed between the lower skins;
   wherein the lower torque box shear strap couples the lower skin of the torque box to the lower inboard flange, thereby coupling the lower skins of the torque box and the wing tip box; and
   wherein the upper torque box shear strap couples the upper skin of the torque box to the upper inboard flange, thereby coupling the upper skins of the torque box and the wing tip box.

6. The propulsion and lift system as recited in claim 5 wherein the upper inboard flange and the upper skin of the torque box each have outer and inner surfaces; and
   wherein the upper torque box shear strap further comprises an outer strap and an inner strap, the outer strap coupling the outer surface of the upper inboard flange to the outer surface of the upper skin of the torque box, and the inner strap coupling the inner surface of the upper inboard flange to the inner surface of the upper skin of the torque box such that the upper inboard flange and an outboard edge of the upper skin of the torque box are sandwiched by the outer and inner straps.

7. The propulsion and lift system as recited in claim 1 wherein the torque box and the wing tip box each further comprise a forward spar, the wing-nacelle splice assembly further comprising a plurality of fasteners coupling the forward spars of the torque box and the wing tip box.

8. The propulsion and lift system as recited in claim 7 wherein the torque box and the wing tip box each further comprise an aft spar, the wing-nacelle splice assembly further comprising an aft spar splice coupling the aft spars of the torque box and the wing tip box.

9. The propulsion and lift system as recited in claim 8 wherein the torque box and the wing tip box each further comprise a lower skin having an outer surface; and
   wherein the wing-nacelle splice assembly further comprises an aft spar splice support at least partially covering the outer surfaces of the lower skins, the aft spar splice support disposed beneath and coupled to the aft spar splice to provide support thereto.

10. The propulsion and lift system as recited in claim 9 wherein the wing tip assembly further comprises an inboard tip rib including a forward inboard flange interposed between the forward spars and an aft inboard flange interposed between the aft spars;
    wherein the plurality of fasteners couple the forward spar of the torque box to the forward inboard flange, thereby coupling the forward spars of the torque box and the wing tip box; and
    wherein the aft spar splice couples the aft spar of the torque box to the aft inboard flange, thereby coupling the aft spars of the torque box and the wing tip box.

11. The propulsion and lift system as recited in claim 10 wherein the forward spar of the torque box further comprises a tab out adapted to overlap the forward inboard flange, the plurality of fasteners adapted to couple the tab out to the forward inboard flange.

12. The propulsion and lift system as recited in claim 1 wherein the wing cove section and the wing tip cove section each further comprise an upper skin, the wing-nacelle splice assembly further comprising an upper cove shear strap coupling the upper skins of the wing cove section and the wing tip cove section.

13. The propulsion and lift system as recited in claim 12 wherein the wing tip assembly further comprises an inboard tip rib including lower and upper inboard flanges;

wherein the wing cove section further comprises an outboard cove rib including lower and upper outboard flanges;

wherein the lower cove shear strap couples the lower outboard flange of the outboard cove rib to the lower inboard flange of the inboard tip rib, thereby coupling the lower skins of the wing cove section and the wing tip cove section; and wherein the upper cove shear strap couples the upper outboard flange of the outboard cove rib to the upper inboard flange of the inboard tip rib, thereby coupling the upper skins of the wing cove section and the wing tip cove section.

14. The propulsion and lift system as recited in claim 13 wherein the outboard cove rib includes an aft outboard flange and the wing tip cove section includes an aft cove spar; and wherein the wing-nacelle splice assembly further comprises an aft cove splice coupling the aft outboard flange of the outboard cove rib to the aft cove spar of the wing tip cove section.

15. A tiltrotor aircraft comprising:

a fuselage;

a wing supported by the fuselage, the wing including a torque box having an outboard end and a wing cove section having an outboard end and a lower skin;

a wing tip assembly including a wing tip box having an inboard end and a wing tip cove section having an inboard end and a lower skin;

a fixed nacelle coupled to the wing tip assembly; and a wing-nacelle splice assembly having inboard and outboard sides and a lower cover shear strap, the inboard side of the wing-nacelle splice assembly coupled to the outboard end of the torque box and the outboard end of the wing cove section, the outboard side of the wing-nacelle splice assembly coupled to the inboard end of the wing tip box and the inboard end of the wing tip cove section and the lower cove shear strap coupled to the lower skins of the wing cove section and the wing tip cove section, thereby coupling the fixed nacelle to the wing.

16. The tiltrotor aircraft as recited in claim 15 wherein the wing cove section and the wing tip cove section each further comprise an upper skin and wherein the wing-nacelle splice assembly further comprising an upper cove shear strap coupling the upper skins of the wing cove section and the wing tip cove section.

17. The tiltrotor aircraft as recited in claim 15 wherein the wing tip assembly further comprises inboard and outboard tip ribs having pillow block mounts protruding vertically therefrom and rotatably receiving a pylon assembly.

* * * * *